(12) United States Patent
Dumbrique

(10) Patent No.: US 7,770,914 B2
(45) Date of Patent: Aug. 10, 2010

(54) PASSENGER AIRBAG MOUNTING APPARATUS

(75) Inventor: Conrad Dumbrique, Lake Orion, MI (US)

(73) Assignee: Autoliv ASP, Inc., Ogden, UT (US)

( * ) Notice: Subject to any disclaimer, the term of this patent is extended or adjusted under 35 U.S.C. 154(b) by 376 days.

(21) Appl. No.: 11/888,020

(22) Filed: Jul. 31, 2007

(65) Prior Publication Data

US 2009/0033070 A1    Feb. 5, 2009

(51) Int. Cl.
   *B60R 21/16*    (2006.01)
(52) U.S. Cl. .................... 280/728.2; 280/732
(58) Field of Classification Search .......... 280/728.1, 280/728.2, 732
   See application file for complete search history.

(56) References Cited

U.S. PATENT DOCUMENTS

| 5,092,627 | A | * | 3/1992 | Igawa ...................... 280/728.2 |
| 5,326,132 | A | | 7/1994 | Musiol et al. |
| 5,364,123 | A | | 11/1994 | Abramczyk et al. |
| 5,387,009 | A | * | 2/1995 | Lauritzen et al. ............ 280/741 |
| 5,393,090 | A | | 2/1995 | Shepherd et al. |
| 5,806,879 | A | | 9/1998 | Hamada et al. |
| 6,224,092 | B1 | | 5/2001 | Sakamoto et al. |
| 6,299,198 | B1 | | 10/2001 | Nakashima et al. |
| 6,394,486 | B1 | * | 5/2002 | Fujimura et al. ......... 280/728.2 |
| 6,761,375 | B2 | * | 7/2004 | Kurachi et al. ............. 280/732 |
| 7,195,273 | B2 | | 3/2007 | Lewis et al. |
| 2005/0225059 | A1 | * | 10/2005 | Lewis et al. .............. 280/728.2 |
| 2005/0225062 | A1 | * | 10/2005 | Dumbrique ............. 280/728.3 |
| 2007/0007752 | A1 | | 1/2007 | Rose et al. |
| 2007/0007753 | A1 | | 1/2007 | Williams et al. |
| 2007/0035111 | A1 | * | 2/2007 | Oh ......................... 280/728.3 |

FOREIGN PATENT DOCUMENTS

WO   WO-2007/043387 A1   4/2007

* cited by examiner

*Primary Examiner*—Faye M. Fleming
*Assistant Examiner*—Drew Brown
(74) *Attorney, Agent, or Firm*—Sally J Brown; Madison IP, P.C.

(57) ABSTRACT

An airbag assembly is described. The airbag assembly includes an airbag housed within an airbag housing and an airbag inflator. A B-ring that engages the airbag housing is also added. The B-ring comprises a base surface, a first stabilizing bracket and a second stabilizing bracket, wherein the first and second stabilizing brackets extend away from the base surface and restrict movement of the airbag housing in a lateral and vertical direction. The airbag assembly may optionally include a vehicle bracket that is capable of being attached to a vehicle structure. The second stabilizing bracket may be secured to the vehicle bracket.

19 Claims, 8 Drawing Sheets

PASSENGER AIRBAG MOUNTING APPARATUS

BACKGROUND OF THE INVENTION

Passenger airbag systems are a type of airbag system currently used on motor vehicles. Like other types of airbags, these passenger airbag systems are designed to inflate and position an airbag in front of a vehicle occupant in the event of a crash or accident. Such airbag systems will protect a vehicle occupant as it will prevent the occupant from harmfully impact the vehicle dashboard (or other portions of the vehicle interior) during a crash.

As their name suggests, passenger airbag systems are positioned on the "passenger side" of the vehicle. The "passenger side" is the side of the vehicle that is adjacent the vehicle driver. Accordingly, passenger airbag systems are specifically designed to protect a vehicle occupant seated in the vehicle's front passenger seat. Passenger airbag systems are generally positioned behind a portion of the vehicle dashboard. Some recent regulations have been passed which makes the inclusion of such passenger airbag systems mandatory on new motor vehicles.

In general, the passenger airbag will be secured to the vehicle structure using a mounting bracket. Specifically, the mounting bracket is secured, via welding, fasteners, etc. to the vehicle frame. Once the mounting bracket is fixed into the proper position, the passenger airbag system will then be secured to the bracket. Usually, a single mounting bracket does not provide adequate support to the airbag system. Accordingly, multiple mounting brackets are required to properly secure the passenger airbag system.

However, the use of multiple mounting brackets for a passenger airbag system increases the number of parts required to attach the airbag to the vehicle. Accordingly, the overall production costs are greatly increased. Further, the use of multiple mounting brackets for a passenger airbag system increases the complexity and difficulty of the manufacturing process. Specifically, it can be difficult to attach the second (or third, fourth, etc.) to the vehicle structure, especially in "compact" or smaller vehicles. As a result, significant time and resources must be devoted to attaching the mounting brackets and the passenger airbag system to the vehicle.

Accordingly, it would be an improvement to construct a new type of mounting bracket (or mounting system) that may be used to attach a passenger airbag system to a vehicle. Such a system is disclosed and taught herein.

BRIEF SUMMARY OF THE INVENTION

An airbag assembly is disclosed. The airbag assembly includes an airbag housed within an airbag housing. An airbag inflator may also be added to the airbag assembly. A B-ring that engages the airbag housing is also added. The B-ring comprises a base surface, a first stabilizing bracket and a second stabilizing bracket. The first and second stabilizing brackets extend away from the base surface and restrict movement of the airbag housing in a vertical and lateral directions. The airbag assembly may additionally include a vehicle bracket that is capable of being attached to a vehicle structure. In some embodiments, the second stabilizing bracket may be secured to the vehicle bracket.

A protective cover may also be added to the airbag assembly. The cover may be used to cover the airbag. The protective cover may be designed to engage the base surface of the B-ring. A plurality of holes positioned around the periphery of the base surface may also be added to the airbag assembly.

One or more housing panels may also be added to the airbag housing. The housing panels may comprise one or more holes. The holes on the panel align with the holes on the base surface.

Further embodiments may be designed in which the first stabilizing bracket abuts a first lateral surface of the airbag housing. The second stabilizing bracket may also abut a second lateral surface of the housing. Other embodiments may be constructed in which the first stabilizing bracket connects to the inflator. Yet further embodiments are designed in which an additional stabilizing bracket is positioned adjacent to the second stabilizing bracket. In these embodiments, the additional stabilizing bracket may abut a second lateral surface of the airbag housing. In other embodiments, the additional stabilizing bracket and the second stabilizing bracket are each connected to the inflator. In further embodiments, the B-ring is designed in which the front stabilizing bracket is constructed to attach to an inflator.

Yet further embodiments may be designed in which the base surface of the B-ring includes one or more hooks. These hooks may be positioned around the periphery of the base surface.

Additional embodiments may be designed in which the B-ring is stamped from a single piece of material. In these embodiments, the first stabilizing bracket and the second stabilizing bracket may be folded so that they extend away from the base surface. Other embodiments may be designed in which the B-ring is molded into a configuration in which the first stabilizing bracket and the second stabilizing bracket extend away from the base surface.

Other embodiments described herein relate to a B-ring designed for use in an airbag assembly. In these embodiments, the B-ring may comprise a base surface and a first stabilizing bracket. The first stabilizing bracket extends away from the base surface. The first stabilizing bracket may also be constructed to engage and/or restrict movement of the airbag housing in a vertical direction. A second stabilizing bracket may also extend away from the base surface. The second stabilizing bracket may also be constructed to engage and restrict movement of the airbag housing in a vertical direction. Further embodiments are designed in which the first stabilizing bracket is constructed to attach to an inflator. Other embodiments are constructed in which the B-ring further comprises an additional stabilizing bracket.

The present embodiments also relate to a method for mounting an airbag assembly to a vehicle structure. In these embodiments, the airbag assembly may comprise an airbag housing, an airbag, and an inflator. The method of mounting an airbag assembly includes the step of installing the airbag into the airbag housing. The airbag housing may also be engaged by a B-ring. The B-ring may comprise a base surface, a first stabilizing bracket, and a second stabilizing bracket, wherein the first and second stabilizing brackets extend away from the base surface. The method may also include the step of attaching the inflator to either the first stabilizing bracket or the second stabilizing bracket. The step of attaching the B-ring to a vehicle bracket may also be performed. In some embodiments, the vehicle bracket is attached to the second stabilizing bracket. In other embodiments, the inflator is attached to the first stabilizing bracket.

As noted above, embodiments for an airbag assembly is taught herein. The airbag assembly may include an airbag, an airbag housing, an airbag inflator, and a B-ring. The B-ring may be used as part of an airbag assembly. The B-ring may be rectangular in shape. The B-ring may also include a base surface. One or more attachment holes may be positioned around the periphery of the base surface. In some embodiments, attachment tabs may be positioned adjacent to the holes. These attachment tabs may extend outwardly from the base surface.

The B-ring may include a first stabilizing bracket. The first stabilizing bracket may be arranged such that it extends away from the base surface. In some embodiments, the first stabilizing bracket extends inwardly and/or downwardly away from the base surface. The first stabilizing bracket may comprise a flange and a body. The body may be attached to the base surface. The flange may be attached at the end of the body. The flange may also include one or more fold lines designed such that the flange may be bent, folded or otherwise manipulated along the fold lines. If the flange is folded along the fold lines, a portion of the flange may become parallel (or substantially parallel) to the base surface.

A second stabilizing bracket may also be added to the B-ring. The second stabilizing bracket extends away from the base surface. In some embodiments, the second stabilizing bracket extends inwardly and/or downwardly away from the base surface. The second stabilizing bracket may include a body and a flange. The body may be attached to the base surface and the flange may be positioned at the end of the body. The flange of the second stabilizing bracket may further include one or more fold lines. The flange may be folded or bent along the fold lines. After such folding/bending occurs, a portion of the flange may be parallel (or substantially parallel) to the base surface.

In some embodiments, an additional stabilizing bracket may also be added to the B-ring. The additional stabilizing bracket may be similar in shape to the second stabilizing bracket. The additional stabilizing bracket may extend away from the base surface. In some embodiments, the additional stabilizing bracket extends inwardly and/or downwardly away from the base surface. The additional stabilizing bracket may include a body and a flange. The body may be attached to the base surface and the flange may be positioned at the end of the body. The flange of the additional stabilizing bracket may further include one or more fold lines. The flange of the additional stabilizing bracket may be folded or bent along the fold lines. After such folding/bending occurs, a portion of the flange may be parallel (or substantially parallel) to the base surface.

When used in an airbag assembly, the first and second stabilizing brackets extend parallel to and abut the lateral surfaces of the airbag housing. These brackets may also engage and/or retain a bottom of the airbag housing. The additional stabilizing bracket, when folded into position, may also extend parallel to and abut a lateral surface of the housing. The additional stabilizing bracket may also may engage or retain a bottom of the airbag housing. The first, second, and additional stabilizing brackets may further be designed to restrict movement of the airbag housing in a vertical direction.

For ease of mounting, some embodiments of the airbag assembly may be designed in which the airbag inflator includes an inflator mounting flange. The inflator mounting flange may be a plate or other similar structure that is positioned around the exterior of the inflator. The inflator mounting flange may be used to attach/secure the inflator to the airbag assembly.

In some embodiments, the vehicle bracket may be secured to the B-ring. Specifically, the vehicle bracket may be secured to the inflator flange and the first stabilizing bracket. In other embodiments, the vehicle bracket may be secured to the second stabilizing bracket. In further embodiments, the vehicle bracket may be secured to the additional stabilizing bracket.

The opposite end of the vehicle bracket (or other portion of the vehicle bracket) may also be secured to a portion of the vehicle structure.

In other embodiments, the B-ring may be designed such that one or more hooks are positioned around the periphery of the base surface. In further embodiments, the hooks may be separated by one or more tabs. The hooks may pass through one or more openings in an airbag cover.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of presently preferred embodiments of the invention.

Figure 1:
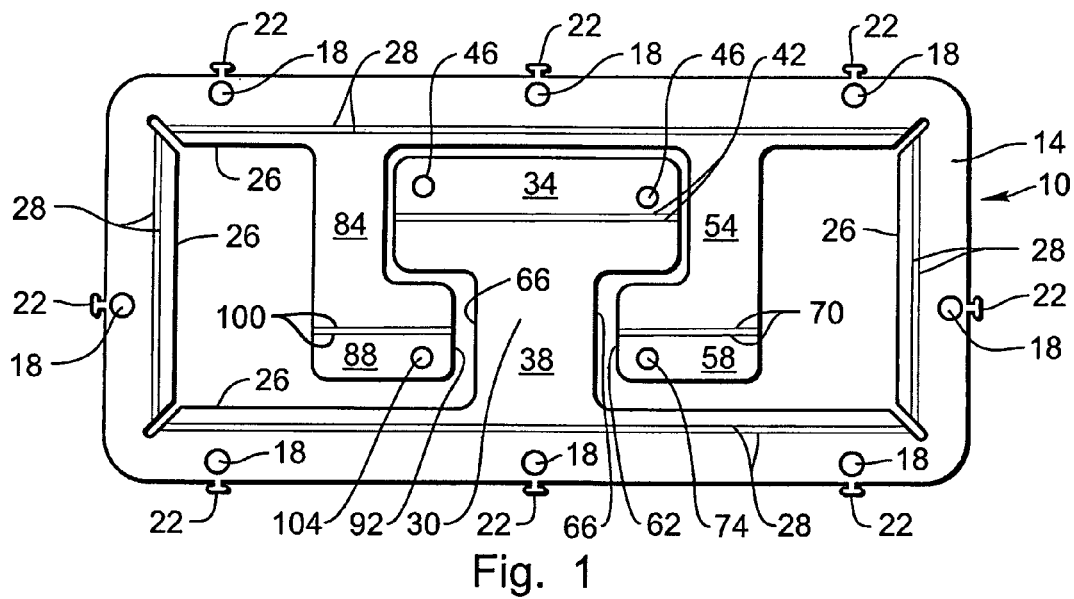
FIG. 1 is a plan view of an embodiment of a B-ring in a flat, pre-folded configuration that may be used in an airbag assembly.
Figure 2:
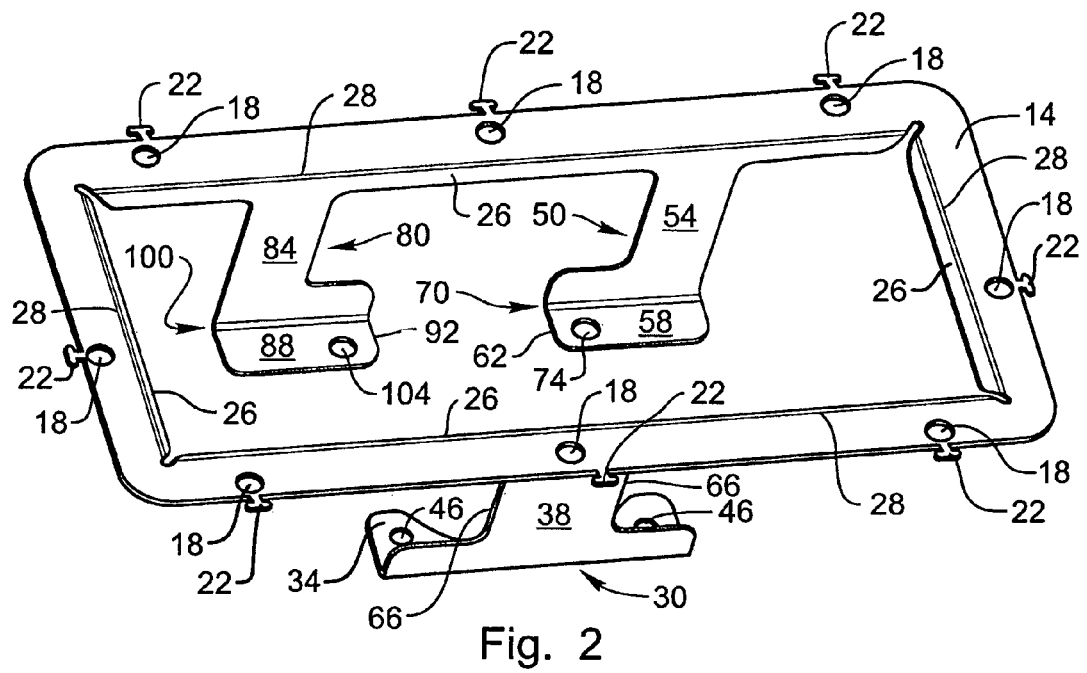
FIG. 2 is perspective view of the embodiment of the B-ring of FIG. 1, wherein B-ring is illustrated in its folded, usable configuration.

Referring now to FIGS. 1 and 2, a B-ring 10 that may be used as part of an airbag assembly is illustrated. FIG. 1 illustrates the B-ring 10 in a flat, unfolded configuration whereas FIG. 2 is a perspective view that illustrates the B-ring 10 after the B-ring has been folded, pressed, or otherwise arranged into its useable (folded) configuration. As will be described in greater detail herein, the configuration shown in FIG. 2 is the configuration that will be mounted onto a vehicle.

The B-ring 10 is specifically designed such that it may be used in conjunction with a passenger airbag system. As shown in FIGS. 1 and 2, the B-ring 10 may be made of a single piece of material such as metal, plastic, or other similar materials. In those embodiments in which the B-ring is made of metal, the B-ring 10 may be stamped, pressed, or formed from a flat sheet of metal. Once the metal B-ring 10 has been formed from the flat sheet, the B-ring 10 may then be bent, folded, or otherwise arranged into the configuration shown in FIG. 2. In other embodiments (including some of the embodiments in which the B-ring 10 is made from plastic), the B-ring 10 will be simply be molded or formed into the useable configuration of FIG. 2.

In the embodiment shown in FIGS. 1 and 2, the B-ring 10 is generally rectangular in shape and includes a base surface 14. In some embodiments, the base surface 14 may be a front surface. One or more attachment holes 18 may be positioned around the periphery of the base surface 14. In some embodiments, attachment tabs 22 may be positioned adjacent to the holes 18. These attachment tabs 22 may extend outwardly from the base surface 14. In other embodiments, the tabs 22 extend laterally away from the base surface, which means that the tabs 22 are generally in the same plane as the base surface 14. In some embodiments, there may be eight (8) tabs 22. Of course, a different number of tabs 22 may also be used, depending on the particular embodiment.

A lip 26 may also be added to the B-ring 10. The lip 26 is a flange or other extension of the base surface 14. As shown in FIG. 1, the lip 26 is co-planar (or substantially co-planar) with the base surface 14 when the B-ring 10 is initially stamped or formed. However, as shown in FIG. 2, the lip 26 may be bent, folded or otherwise manipulated so that it is no longer co-planar with the base surface 14. Such bending or folding may occur along fold lines 28. Such bending or folding may cause the lip 26 to become perpendicular or substantially perpendicular to the base surface 14. In some embodiments, the lip 26 is bent or folded inwardly and/or downwardly from the base surface 14.

A first stabilizing bracket 30 may also be added to the B-ring 10. As shown in FIG. 1, the first stabilizing bracket 30 may be co-planar with the base surface 14 when the B-ring 10 is initially stamped or formed. However, when the lip 26 is folded along the fold lines 28, the first stabilizing bracket 30 is moved such that it is no longer co-planar with the base surface 14 (as shown in FIG. 2). As shown in FIG. 2, the first stabilizing bracket 30 extends away from the base surface 14. In some embodiments, the first stabilizing bracket 30 extends inwardly and/or downwardly away from the base surface 14.

In some embodiments, the first stabilizing bracket 30 comprises a flange 34 and a body 38. The body 38 is attached to the base surface 14 whereas the flange 34 is positioned at the end of the body 38. The flange 34 may also include one or more fold lines 42. The fold lines 42 are designed such that the flange 34 may be bent, folded or otherwise manipulated along the fold lines 42, as illustrated in FIG. 2. As shown in FIG. 2, if the flange 34 is folded along the fold lines 42, a portion of the flange 34 may become parallel or substantially parallel to the base surface 14.

One or more attachment holes 46 may also be added to the first stabilizing bracket 30. In the embodiment shown in FIGS. 1 and 2, the attachment holes 46 have been added to the flange 34. The holes 46 are sized and configured such that a fastener may be passed through the holes 46. As will be explained in greater detail herein, in some embodiments, the holes 46 may be used to connect the first stabilizing bracket 30 to an airbag inflator. In other embodiments, the holes 46 may be used to connect the first stabilizing bracket 30 to a portion of the vehicle structure (not shown). In yet further embodiments, the holes 46 may be used to connect the first stabilizing bracket 30 to a portion of the vehicle bracket (such as a CCB bracket).

Referring still to FIGS. 1 and 2, a second stabilizing bracket 50 may also be added to the B-ring 10. As shown in FIG. 1, the second stabilizing bracket 50 may be co-planar with the base surface 14 when the B-ring 10 is initially stamped or formed. However, when the lip 26 is bent along the fold lines 28, the second stabilizing bracket 50 is moved such that it is no longer co-planar with the base surface 14. As shown in FIG. 2, the second stabilizing bracket 50 may extend away from the base surface 14. In some embodiments, the second stabilizing bracket 50 extends inwardly and/or downwardly away from the base surface 14.

The second stabilizing bracket 50 may include a body 54 and a flange 58. The body 54 is attached to the lip 26 (or the base surface 14) and the flange 58 may be positioned at the end of the body 54. As shown in FIG. 1, the edge 62 of the flange 58 may be positioned proximate to the edge 66 the body 38 of the first stabilizing bracket 30 when the B-ring is in a planar configuration. In some embodiments, the distance between the edge 62 and the edge 66 is at least three (3) millimeters. Of course, the size of the B-ring 10, the first stabilizing bracket 30 or the second stabilizing bracket 50 may be modified such that the distance between the edges 66, 62 is greater than or less than 3 millimeters.

The flange 58 of the second stabilizing bracket 50 may further include one or more fold lines 70. As shown in FIG. 2, the flange 58 may be folded or bent along the fold lines 70. After such folding/bending occurs, a portion of the flange 58 may be parallel or substantially parallel to the base surface 14.

One or more attachment holes 74 may also be added to the second stabilizing bracket 50. In the embodiment shown in FIGS. 1 and 2, the attachment holes 74 have been added to the flange 58. The holes 74 are sized and configured such that a fastener (not shown) may be passed through the holes 74. As will be explained in greater detail herein, in some embodiments, the holes 74 may be used to connect the second stabilizing bracket 50 to an airbag inflator. In other embodiments, the holes 74 may be used to connect the second stabilizing bracket 50 to portion of the vehicle structure. In yet further embodiments, the holes 74 may be used to connect the second stabilizing bracket 50 to portion of the vehicle bracket (such as a CCB bracket).

In some embodiments, an additional stabilizing bracket 80 may also be added to the B-ring 10. It should be noted that the additional stabilizing bracket 80 is optional. Embodiments may also be constructed in which the additional stabilizing bracket 80 is not included as part of the B-ring 10. In some embodiments, the additional stabilizing bracket 80 is similar in shape to that of the second stabilizing bracket 50. In fact, in some embodiments, the additional stabilizing bracket 80 has a shape that is the "mirror image" of the second stabilizing bracket 50.

Like the second stabilizing bracket 50, the additional stabilizing bracket 80 may be co-planar with the base surface 14 when the B-ring 10 is initially stamped or formed. However, when the lip 26 is bent along the fold lines 28, the additional stabilizing bracket 80 is moved such that it is no longer co-planar with the base surface 14 (as shown in FIG. 2). The additional stabilizing bracket 80 may extend away from the base surface 14. In some embodiments, the additional stabilizing bracket 80 extends inwardly and/or downwardly away from the base surface 14.

The additional stabilizing bracket 80 may include a body 84 and a flange 88. The body 84 is attached to the lip 26 (or the base surface 14) and the flange 88 may be positioned at the end of the body 84. As shown in FIG. 1, the edge 92 of the flange 88 may be positioned proximate to the edge 66 the body 38 of the first stabilizing bracket 30 when the B-ring is in a planar configuration. In some embodiments, the distance between the edge 92 and the edge 66 is at least three (3) millimeters. Of course, the size of the B-ring 10, the first stabilizing bracket 30 or the additional stabilizing bracket 80 may be modified such that the distance between the edges 66, 92 is greater than or less than 3 millimeters.

The flange 88 of the additional stabilizing bracket 80 may further include one or more fold lines 100. As shown in FIG. 2, the flange 88 may be folded or bent along the fold lines 100. After such folding/bending occurs, a portion of the flange 88 will be parallel or substantially parallel to the base surface 14.

One or more attachment holes 104 may also be added to the second stabilizing bracket 50. In the embodiment shown in FIGS. 1 and 2, the attachment holes 104 have been added to the flange 88. The holes 104 are sized and configured such that a fastener (not shown) may be passed through the holes 104. As will be explained in greater detail herein, in some embodiments, the holes 74 may be used to connect the additional stabilizing bracket 80 to an airbag inflator. In other embodiments, the holes 104 may be used to connect the additional stabilizing bracket 80 to portion of the vehicle structure. In yet further embodiments, the holes 104 may be used to connect the additional stabilizing bracket 80 to portion of the vehicle bracket (such as a CCB bracket).

Figure 3A:
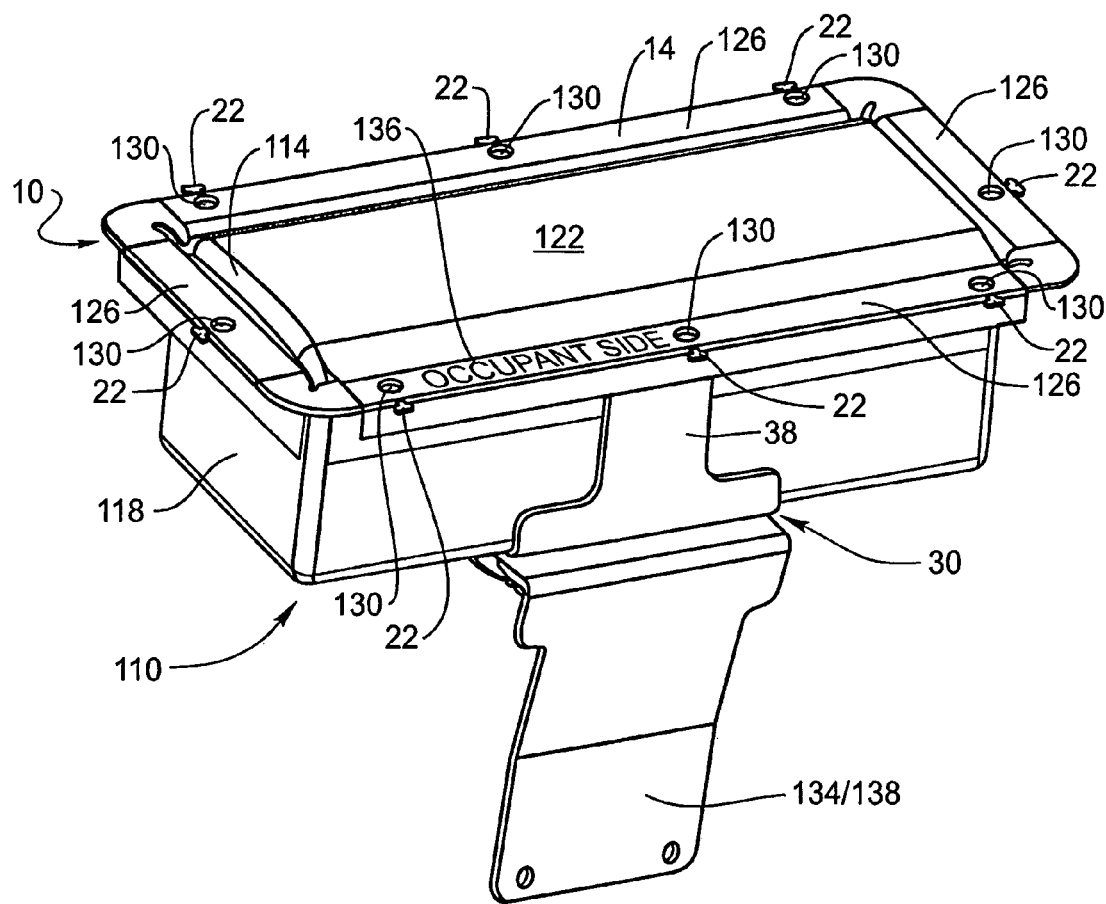
FIG. 3A is a perspective view which illustrates an airbag assembly that incorporates an embodiment of the B-ring of FIG. 2.

Referring now to FIG. 3A, the B-ring 10 is used in as part of an airbag assembly 110. The airbag assembly 110 may, in some embodiments, be a passenger airbag assembly that may be used and installed onto the passenger side of a vehicle (not shown in FIG. 3A). The airbag assembly 110 includes an airbag 114 and an airbag housing 118. The housing 118 may be used to house or contain the airbag 114. A protective cover 122 may be positioned over all or a portion of the airbag 114. In some embodiments, the tabs 22, which were added to the base surface 14 of the B-ring 10, are passed through holes (not shown) in the cover 122. Such threading of the tabs 22 through holes in the cover 122 secures the cover 122 in the proper position. In other embodiments, the tabs 22 may be passed through openings in the airbag housing 118 to secure the housing 118 to the B-ring.

A label 136 may also be added to the airbag assembly 110. The label 136 may be positioned on the cover 122. The label 136 may include writing such as "occupant side" which provides guidance, instructions, or other information to the installer. The airbag manufacturer's logo may also be added. Other information, writing, symbols, etc. may also be used as part of the label 136.

The airbag housing 118 may be generally rectangular in shape and may be sized such that the size of the housing 118 corresponds with the size of the B-ring 10. In some embodiments, the airbag housing 118 may be made of a flexible material, such as fabric. However, other materials, such as plastic, metal, etc. may also be used for the housing 118. In some embodiments, the airbag housing 118 may take the form a rectangular solid with an approximate length of 260 millimeters, an approximate width of 100 millimeters, and an approximate height of 70 millimeters. Thus, in some embodiments, the distance between the protective cover 122 and the bottom of the housing 118 may be about 70 millimeters. Other sizes, dimensions, and shapes may also be used, as necessary. The size of the B-ring 10 may be designed such that the dimensions of the B-ring 10 are similar and/or identical to the dimensions of the airbag housing 110.

The airbag housing 118 may include one or more housing panels 126. Such housing panels 126 may be designed to overlap the periphery of the base surface 14. Such panels 126 may further include one or more holes 130. When the housing panels 126 overlap the periphery of the base surface 14, the holes 130 may be aligned with the attachment holes 18 of the base surface 14. In some embodiments, connectors (such as fasteners, tabs, etc.) may engage the holes 130, 18 to connect a cover/panel to the airbag assembly 110. Such positioning of a cover/panel over the airbag assembly 110 prevents the vehicle occupant from viewing the undeployed airbag assembly 110, and thus, increases the overall decor of the vehicle interior. Of course, during an accident or crash, the airbag assembly 110 will inflate and deploy the airbag 114 through the cover/panel and positions the inflated airbag 114 within the vehicle interior in a location that may prevent the occupant from harmful impact with a surface of the vehicle interior.

As shown in FIG. 3A, a vehicle bracket 134 may also be attached and used with the airbag assembly 110. The vehicle bracket 134 is a metal bracket, plate, or other structure that is used to connect the B-ring 10 to a portion of the vehicle structure (not shown). The way in which the vehicle bracket 134 may be connected to the B-ring 10 is described herein. In some embodiments, this vehicle bracket 134 may be a CCB bracket 138. However, other types of structures may also be used as the vehicle bracket 134.

Figure 3B:
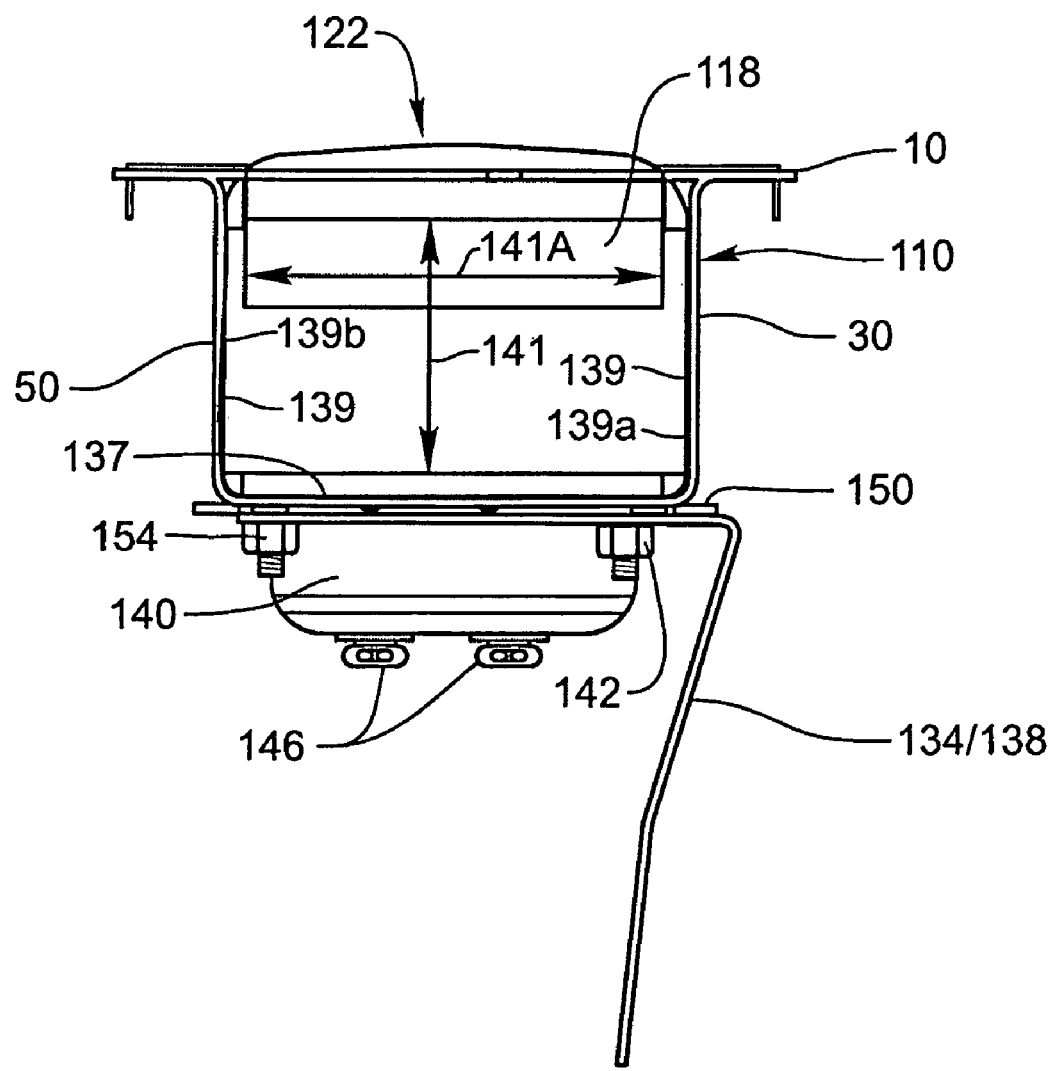
FIG. 3B is a side view of the airbag assembly of FIG. 3A.

Referring now to FIG. 3B, a side view illustrates the way in which the stabilizing brackets 30, 50 surround and/or engage the airbag housing 118. Specifically, the stabilizing brackets 30, 50, when folded into position, extend parallel to and abut the lateral surfaces 139 of the housing 118. The first and second stabilizing brackets 30, 50 may also engage and/or retain a bottom 137 of the airbag housing 118. The first stabilizing bracket 30, when folded into position, may extend parallel to and abut a first lateral surface 139*a* and may engage or retain a bottom 137 of the airbag housing 118. The second stabilizing bracket 50, when folded into position, may extend parallel to and abut a second lateral surface 139*b* and may engage or retain a bottom 137 of the airbag housing 118. The additional stabilizing bracket 80, when folded into position, may extend parallel to and abut the second lateral surface 139*b* and may engage or retain a bottom 137 of the airbag housing 118.

The stabilizing brackets 30, 50, 80 may be designed to restrict movement of the airbag housing 118 in a vertical direction. The term "in a vertical direction" refers to the direction associated with the "height" of the housing 118 and is perpendicular to the flat surface of the cover 122. (The vertical direction is represented by arrow 141.) Accordingly, the brackets 30, 50, 80 may be designed to restrict movement of the housing 118 in this vertical direction. In other embodiments, the brackets 30, 50, 80 will completely prevent the housing 118 from moving in the vertical direction. In some embodiments, the portions of the brackets 30, 50, 80 that engage the bottom 137 of the housing 118 may operate to restrict (or prevent) the movement of the housing 118 in the vertical direction. In some embodiments, the brackets 30, 50, 80 only restrict vertical movement when the airbag system is fully assembled. The stabilizing brackets 30, 50, 80 may be designed to restrict movement of the airbag housing 118 in a lateral direction. The term "in a lateral direction" refers to the direction associated with the "width" of the housing 118 and is parallel to the flat surface of the cover 122. (The lateral direction is represented by arrow 141a.) Without the brackets 30, 50, 80, there may be a tendency for the assembly 110 to move laterally relative to surface 14. Accordingly, the brackets 30, 50, 80 may be designed to restrict movement of the housing 118 or the assembly in this lateral direction. In other embodiments, the brackets 30, 50, 80 will completely or partially prevent the housing 118/assembly from moving in the lateral direction. In some embodiments, the brackets 30, 50, 80 only restrict lateral movement when the airbag system is fully assembled. In some embodiments, portions of the B-ring 10 may enclose a portion of the housing 118 and may prevent lateral movement of the housing 118 or other portions of the assembly 110 in the lateral direction.

As shown in FIG. 3B, an inflator 140 may also be added to the airbag assembly 110. The inflator 140 is a device that is capable of producing and/or channeling a large quantity of inflation gas into the airbag 114 (not shown in FIG. 3B) during deployment. This influx of inflation gas during deployment inflates the airbag 114 and causes the airbag 114 to become positioned on the interior of the vehicle. As shown in FIG. 3B, a portion of the inflator 140 may be positioned within the airbag housing 118. One or more wire connections 146 may also be added to the inflator 140. These connections 146 may receive one or more wires (not shown). In the event of an accident or crash, an electric signal may be conveyed into the inflator 140 via the wire connections 146. As is known in the art, this electrical signal deploys the inflator 140 and causes the inflator 140 to produce/channel the volume of inflation gas that is used to deploy/inflate the airbag 114.

The inflator 140 may also include an inflator mounting flange 150. The inflator mounting flange 150 is a plate or other similar structure that is positioned around the exterior of the inflator 140. The inflator mounting flange 150 may be used to attach/secure the inflator 140 to the airbag assembly 110. In some embodiments, the inflator flange 150 is positioned proximate a middle of the inflator 140.

FIG. 3B also illustrates the way in which the vehicle bracket 134 may be secured to the B-ring 10. Specifically, the vehicle bracket 134 is secured to the inflator mounting flange 150 and the first stabilizing bracket 30 via one or more fasteners 142. These fasteners 142 may be passed through holes in the vehicle bracket 134 and the inflator flange 150. The fasteners may also pass through the attachment holes 46 (shown in FIG. 2) positioned in the first stabilizing bracket 30. Other embodiments may be designed in which the vehicle bracket 134 is secured to the B-ring 10 via welding, adhesives, etc.

In other embodiments, the vehicle bracket 134 may be secured to the second stabilizing bracket 50. In further embodiments, the vehicle bracket 134 may be secured to the additional stabilizing bracket 80. Additional embodiments may also be described in which the vehicle bracket 134 is secured to both the additional stabilizing bracket 80 and the second stabilizing bracket 50. Other embodiments may also be described in which the vehicle bracket 134 is secured to both the additional stabilizing bracket 80 and the first stabilizing bracket 30.

As shown in FIG. 3B, the second stabilizing bracket 50 may also be secured to the inflator 140. Specifically, the inflator flange 150 may be secured to the second stabilizing bracket 50 via one or more fasteners 154. In other embodiments, the inflator flange 150 may also be secured to the additional stabilizing bracket 80 via fasteners 154. Other embodiments may also be constructed in which the inflator flange 150 is attached the second stabilizing bracket 50 and/or the additional stabilizing bracket 80 via welding, adhesives, etc. Still further embodiments may be designed in which the inflator flange 150 is secured to the first stabilizing bracket 30 via the fasteners 154. Further embodiments may be designed in which only the first stabilizing bracket 30 is secured to the inflator 140 (or the inflator flange 150). Other embodiments may be designed in which only the second stabilizing bracket 50 is secured to the inflator 140 (or the inflator flange 150). Further embodiments may be designed in which only the additional stabilizing bracket 80 is secured to the inflator 140 (or the inflator flange 150).

Figure 4:
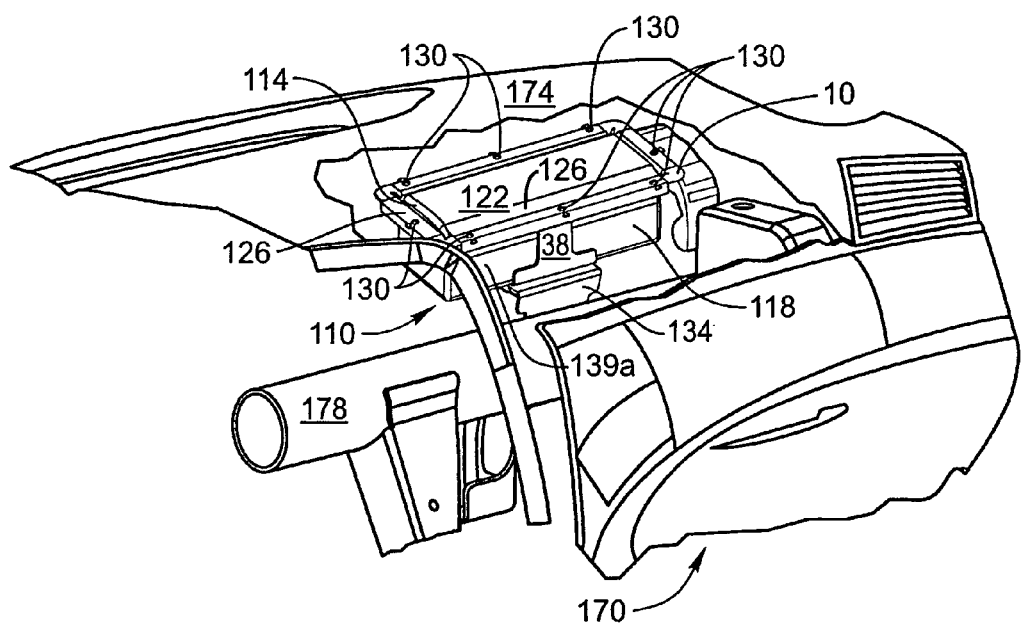
FIG. 4 is a perspective view of the airbag assembly of FIG. 3A in which the airbag assembly is mounted onto a vehicle structure.

Referring now to FIG. 4, a perspective view shows the airbag assembly 110 mounted onto a vehicle interior 170. In this embodiment, a panel 174 covers the airbag assembly 110 to prevent the airbag assembly 110 from being visible to the occupant during normal use of the vehicle. In some embodiments, the panel 174 may be a dashboard panel. In other embodiments, the panel 174 may be a portion of the vehicle's instrument panel. As noted above, the airbag 114 will deploy through the panel 174 during an accident or crash to protect a vehicle occupant. In the embodiment shown in FIG. 4, the panel 174 simply overlays the airbag assembly 110. However, in other embodiments, the panel 174 may include tabs, flanges, etc. that engage the holes 18 (shown in FIG. 2) in the B-ring 10 or the holes 130 in the airbag housing 118. Such engagement between the panel 174 and the holes 18 and/or 130 may further operate to secure the panel 174 to the airbag assembly 110.

As shown in FIG. 4, the vehicle bracket 134 may also be secured to a portion of the vehicle structure 178. This vehicle structure 178 may be a bar, pole, support or other portion of the vehicle frame. In the embodiment show in FIG. 4, the vehicle structure 178 is a portion of the vehicle frame.

Figure 5:
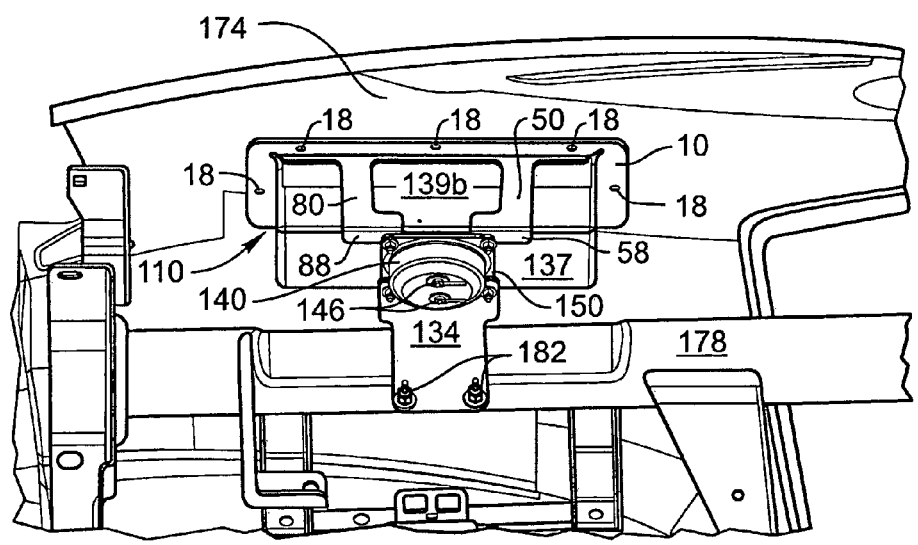
FIG. 5 is a perspective view of the underneath side of the airbag assembly of FIG. 4 that has been mounted onto the vehicle structure.

FIG. 5 is a view of the underside of the airbag assembly 110 that further illustrates one way in which the airbag assembly 110 may be secured to the vehicle structure 178. As described above, the vehicle bracket 134 (which may be a CCB bracket) is attached to the B-ring 10. In turn, the vehicle bracket 134 may be secured to the vehicle structure 178 via fasteners 182. In other embodiments, the vehicle bracket 134 may be secured to the vehicle structure 178 via welding, adhesives, or other similar means.

As shown in FIG. 5, the B-ring 10 may be constructed such that the second stabilizing bracket 50 is secured to a corner of the inflator flange 150 and the additional stabilizing bracket 80 is secured to another corner of the inflator flange 150. The two opposite corners (i.e., the corners on the opposite side of the inflator 140) are secured to the first stabilizing bracket 130. In other embodiments, only one corner of the inflator flange 150 is secured to the first stabilizing bracket 30. In other embodiments, other portions of the inflator flange 150 are secured to one or more of the stabilizing brackets 30, 50, 80. Further embodiments may be designed in which one or more of the stabilizing brackets 30, 50, 80 are secured to a portion of the inflator 140.

Figure 6:
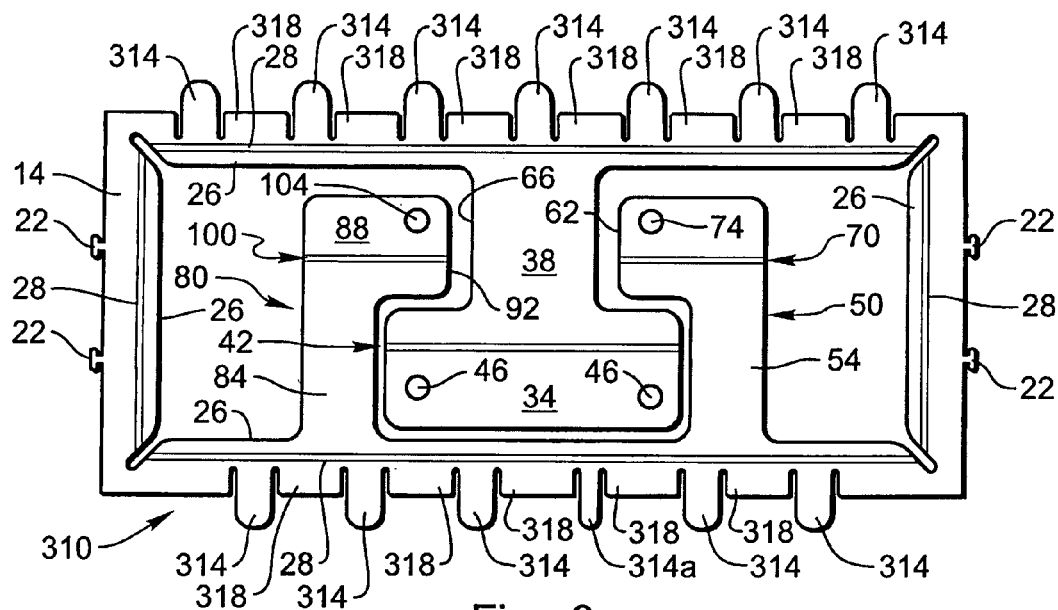
FIG. 6 is a plan view of another embodiment of a B-ring in a pre-folded configuration that may be used in an airbag assembly.

Referring now to FIG. 6, another embodiment of a B-ring 310 is illustrated. The B-ring 310 is similar to the B-ring 10 described above. In some embodiments, the B-ring 310 may be used in the airbag assembly 110 (not shown in FIG. 6) instead of the B-ring 10. Accordingly, much of the above-recited description related to the B-ring 10 and/or the airbag assembly 110 applies equally to the B-ring 310. However, for purposes of brevity, this description will not be repeated.

Like the B-ring 10, the B-ring 310 comprises a first stabilizing bracket 30, a second stabilizing bracket 50 and an additional stabilizing bracket 80. As shown in FIG. 6, these stabilizing brackets 30, 50, 80 are co-planar with the base surface 14 of the B-ring 310. However, as with the previous embodiment, the stabilizing brackets 30, 50, 80 may be folded, bent, or otherwise positioned such that they extend inwardly and/or rearwardly from the base surface 14.

As with the previous embodiment, the B-ring 310 may be stamped, pressed, or otherwise formed from a single piece (sheet) of material. Further embodiments may be designed in which the B-ring 310 is made from a variety of different components that have been secured together (via welding, adhesives, etc.) Other embodiments are designed in which the B-ring 310 is made from a plastic or other material in which the stabilizing brackets 30, 50, 80 are molded such that they extend away from the base surface 14.

Unlike the B-ring 10 discussed above, the base surface 14 of the B-ring 310 may not include any holes or opening. Rather, the base surface 14 of the B-ring 310 may include one or more hooks 314 that are positioned around the periphery of the base surface 14. As shown in FIG. 6, the hooks 314 may be separated by one or more tabs 318. In some embodiments, each of the tabs 318 has the same size and/or shape. Likewise, embodiments may be constructed in which each of the hooks 314 have the same size and/or shape. In other embodiments, at least one of the hooks, which is designated as "hook 314a," has a different size and/or shape from the other hooks 314. (As shown in this Figure, the hook 314a is smaller than the other hooks 314). Other embodiments may be made in which at least one of the hooks is larger than the other hooks 314. Additional embodiments may be designed in which at least one of the tabs 318 has a size and/or shape that is different from the remaining tabs 318.

One or more attachment tabs 22 may extend outwardly from the base surface 14 as desired. As with the B-ring 10, a lip 26 may also be added to the base surface 14. The lip 26 is shown in FIG. 6 as being co-planar with the base surface 14. However, as explained above, the lip 26 may be folded, bent, etc. inwardly and/or rearwardly. The attachment tabs 22 may be passed through openings in the airbag housing 118 to further secure the B-ring 310 to the airbag assembly 110.

Figure 7:
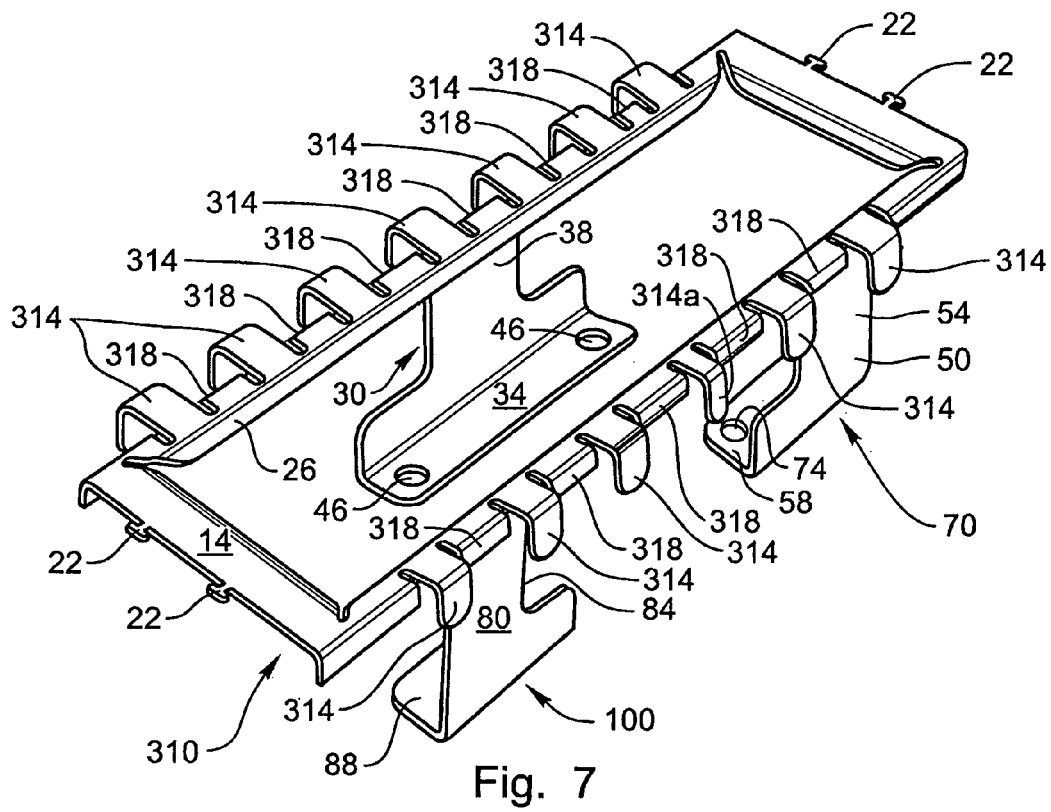
FIG. 7 is perspective view of the embodiment of the B-ring of FIG. 6, wherein B-ring is illustrated in its folded, usable configuration.

FIG. 7 is a perspective view of the B-ring 310 that is similar to the view illustrated in FIG. 2. As shown in FIG. 7, the lip 26 has been bent, folded, or otherwise configured such that the lip 26 is no longer co-planar with the base surface 14. In FIG. 7, the lip 26 has been folded inwardly and/or rearwardly from the base surface 14. In turn, such arrangement of the lip 26 causes the stabilizing brackets 30, 50, 80 to extend away from the base surface 14. Of course, other mechanisms and/or ways for causing one or more of the stabilizing brackets 30, 50, 80 to extend away from the base surface 14 may also be used.

The tabs 318 may also be bent, folded, or otherwise configured so that the tabs 318 (or at least a portion of the tabs) are not co-planar with the base surface 14. Rather, as shown in FIG. 7, the tabs 318 may be bent inwardly and/or rearwardly. In some embodiments, once the tabs 318 have been bent in this manner, the tabs 318 can engage and/or retain a portion of the airbag housing 118 (as shown in FIG. 8).

Figure 9:
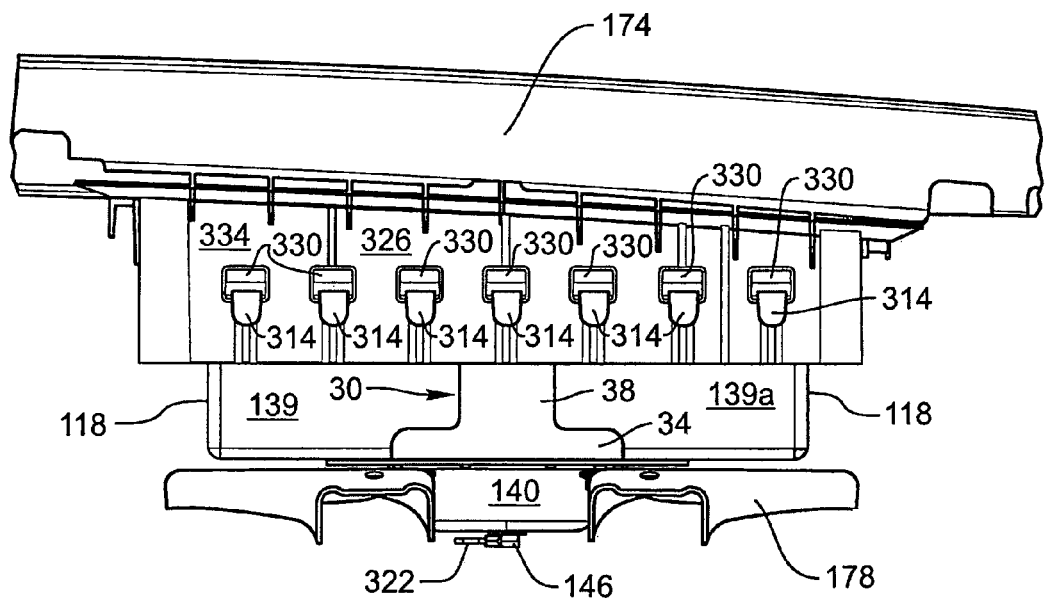
FIG. 9 is a side view that illustrates an airbag assembly of FIG. 8 in which a cover has been added to the airbag assembly.

The hooks 314 (including the hook 314a) may also be bent, folded, or otherwise configured so that the hooks 314 are not co-planar with the base surface 14. Rather, the hooks 314 (or a portion of the hooks 314) may extend inwardly and/or rearwardly from the base surface 14. As is shown in FIG. 9, the hooks 314 may engage an airbag cover, trim panel, or other similar feature. In other embodiments, the hooks 314 may engage a portion of the airbag housing 118.

Figure 8:
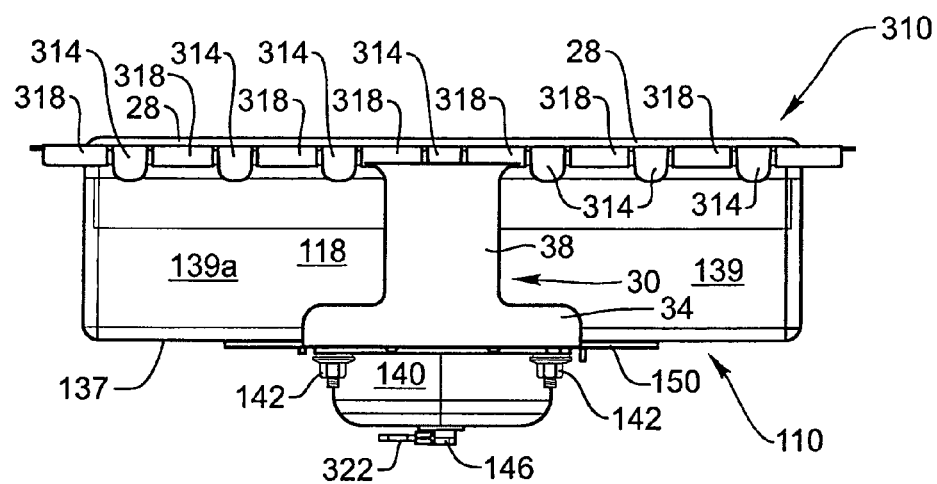
FIG. 8 is a side view that illustrates an airbag assembly according to the present embodiments that incorporates the B-ring of FIG. 7.

FIG. 8 is a side view that illustrates the B-ring 310 being used as part of an airbag assembly 110. FIG. 8 also shows one way in which the B-ring 310 may engage the airbag housing 118. As with the B-ring 310, a portion of the first stabilizing bracket 30 is, when bent, positioned such that it is parallel to the side 139 while another portion of the first stabilizing bracket 30 engages and/or retains a bottom surface 137 of the housing 118. As with the previous embodiment, fasteners are used to secure the first stabilizing bracket 30 to an inflator flange 150. One or more wires 322 may connect to the wire connections 146. In the event of an accident or a crash, these wires 322 will transmit the appropriate signal to the inflator 140 and will cause the inflator 140 to deploy and produce/channel inflation gas into the airbag 114 (not shown in FIG. 8).

Referring now to FIG. 9, a side view illustrates the way in which the airbag assembly 110 may be secured to a vehicle structure 178. Specifically, the inflator flange 150 does not necessarily need to be secured to a vehicle bracket 134. Rather, in some embodiments, the inflator flange 150 may be secured directly to a portion of the vehicle structure 178. Of course, other embodiments may be constructed in which the inflator flange 150 is secured to a vehicle bracket (such as a CCB bracket) and, in turn, the vehicle bracket is secured to the vehicle structure 178.

As shown in FIG. 9, a panel 174 may be used to cover the airbag assembly 110. The panel 174 may be a portion of the vehicle interior. In some embodiments, the panel 174 is a portion of the dashboard. However, in other embodiments, the panel 174 is a layer that goes over the assembly 110. One or more additional layers of trim, etc. may be positioned over the panel 174 as desired. As described above, the airbag assembly 110 will deploy the airbag 114 (not shown) through the panel 174 to protect the vehicle occupant.

As shown in FIG. 9, the airbag assembly 110 may further include a cover 326 that protects the airbag 114. In some embodiments, the cover 326 may replace the protective cover 122 (shown in FIG. 3). However, in other embodiments, the cover 326 may replace the protective cover 122. The cover 322 may include one or more openings 330 that extend along a side 334 of the cover 326. As shown in FIG. 9, the hooks 314 (including the hooks 314a) have been threaded through the openings 330. Such threading of the hooks 314 operates to secure the cover 326 to the B-ring 310. The cover 326 may also overlap all or a portion of the side 139 of the airbag housing 118.

Figure 10:
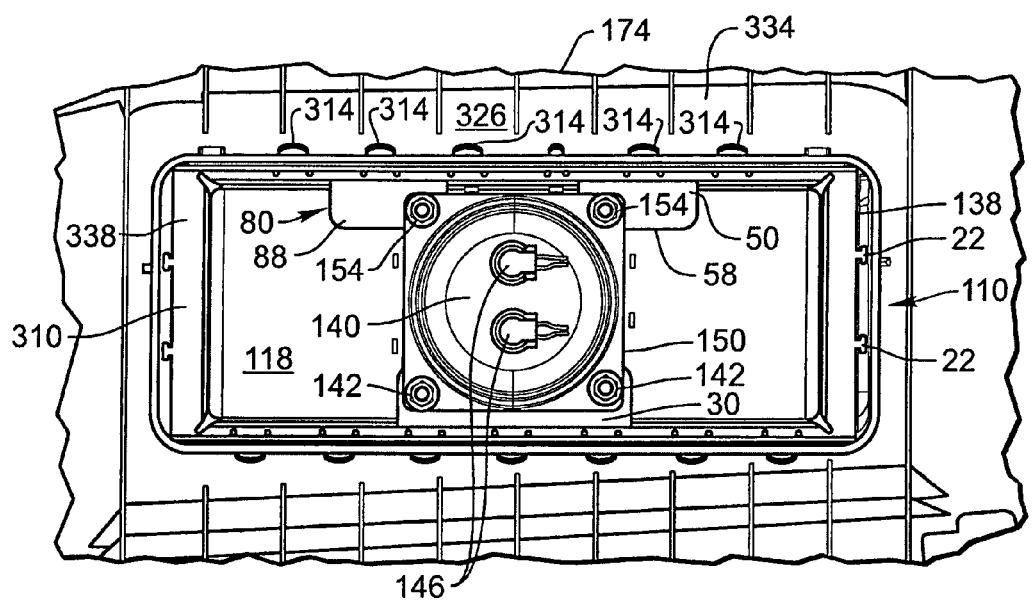
FIG. 10 is an underneath side view of the airbag assembly of FIG. 9.

Referring now to FIG. 10, a bottom view of the airbag assembly 110 of FIG. 9 is illustrated. As with the embodiment described above, the B-ring 310 engages the four corners of the inflator flange 150. Specifically, the second stabilizing bracket 50 and the additional stabilizing bracket 80 each engage a corner of the inflator flange 150. The first stabilizer bracket 30 engages the two remaining corners of the inflator flange 150.

As shown in FIG. 10, the cover 326 may overlap and/or surround all four sides of the airbag housing 118. However, other embodiments may also be designed in which the cover 326 surrounds and/or overlaps less than all of the sides of the housing 118. Further, as shown in FIG. 9, the tabs 22 that are positioned on the B-ring 310 do not pass through holes/openings in the cover 326. Of course, other embodiments may be designed in which the tabs 22 do pass through holes/openings in the cover 326. Such engagement between the tabs 22 and holes/openings in the cover 326 will further strengthen the engagement/connection between the cover 326 and the airbag assembly 110. Depending upon the embodiment, a gap 338 may or may not exist between the cover 326 and a portion of the B-ring 310. In other embodiments, the use of the cover 326 may allow the airbag assembly 110 to be used with panels, covers, dashboards, etc. that have different shapes, sizes, and/or configurations.

Figure 11:
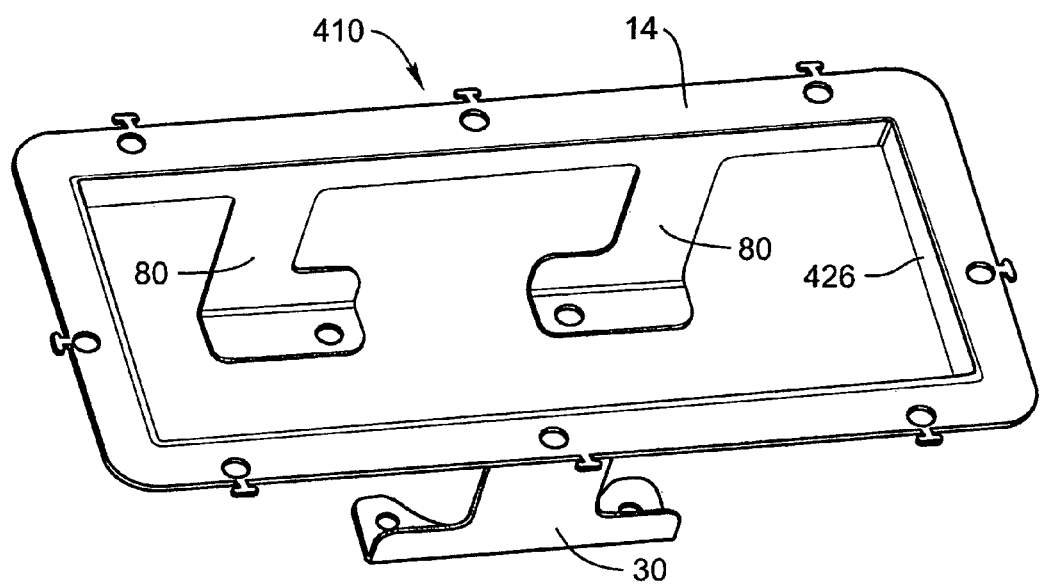
FIG. 11 is another type embodiment of a B-ring that may be used in an airbag assembly.

Referring now to FIG. 11, an additional embodiment of a B-ring 410 is illustrated. The B-ring may be used in an airbag assembly, as described herein. The embodiment of the B-ring 410 is similar and/or nearly identical to the embodiment of the B-ring 10 shown and describe above in FIG. 2. Accordingly, for purposes of brevity, a description of many of the features/elements of the B-ring 410 that are similar to the features/elements of FIG. 2 will be omitted. In fact, the principal difference between the B-ring 410 involves the configuration of the lip. Specifically, in the embodiment of FIG. 2, the lip 26 has breaks (or "relief cuts") positioned at the corners. These relief cuts may facilitate the bending of the lip 26 in the proper position. However, in FIG. 11, the lip 426 of the B-ring 410 is a continuous flange that lacks any relief cuts or breaks at the corners. In some embodiments, having the lip 426 be a continuous flange may be desirable as it B-ring 410 may achieve an overall higher bending resistance and/or the presence of the continuous flange may increase the structural integrity of the lip 426.

Figure 12A:
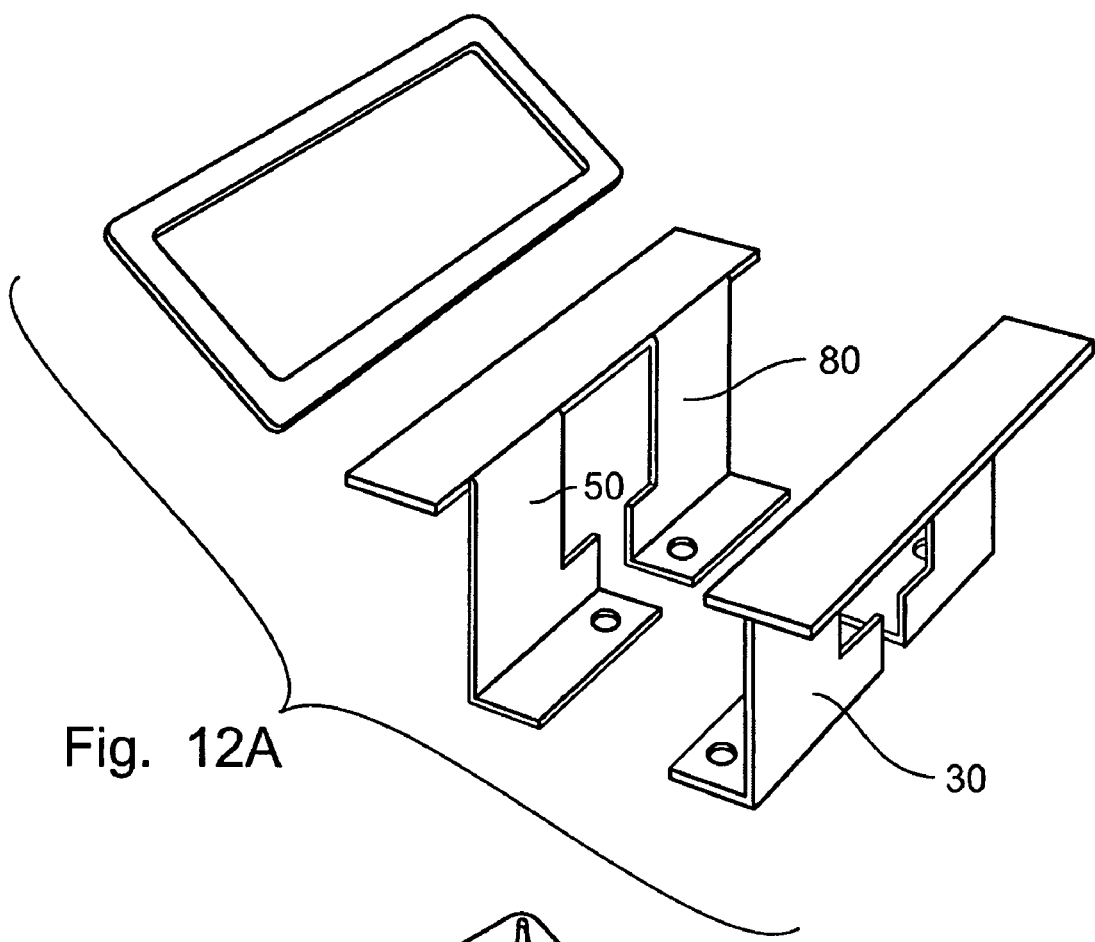
FIGS. 12A and 12B are further embodiments of a B-ring may be used in an airbag assembly.

Referring now to FIG. 12A, a further embodiment of a B-ring 510 is illustrated. The B-ring may be used in an airbag assembly, as described herein. The embodiment of the B-ring 510 is similar to the embodiments disclosed above. Accordingly, for purposes of brevity, a description of many of the features/elements of the B-ring 510 that are similar to the features/elements of the previous embodiments will be omitted. The difference between the B-ring 510 and that which was describe above is that in FIG. 12A, the B-ring 510 comprises distinct pieces. Specifically, the B-ring 510 comprises a distinct front surface 14 and distinct brackets 30, 50, 80. These pieces are separately formed (such as by stamping, pressing, etc.). Once these pieces have been separately stamped, they may be attached together, via secondary operations such as welding, riveting, fastening with fasteners, etc., to form the B-ring 510.

Figure 12B:
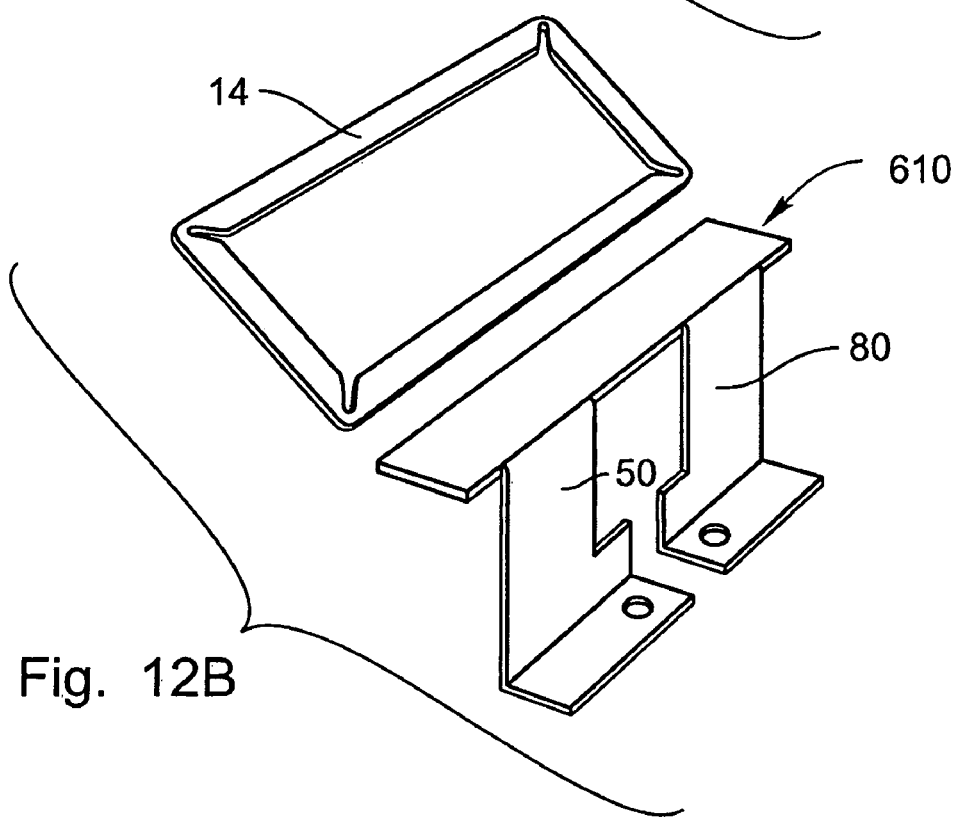

FIG. 12B shows a further embodiment of a B-ring 610 is illustrated. The B-ring may be used in an airbag assembly, as described herein. The embodiment of the B-ring 610 is similar to the embodiments disclosed in FIG. 12A. Specifically, FIG. 12B shows that the brackets 50 and 80 may be formed, stamped, or pressed, as an individual pieces. Once these brackets have been stamped, they may be attached together, via welding, fastening, riveting, etc. and then attached to the front surface 14, in the manner described above.

Referring now to all of the Figures collectively, the present embodiments may also relate to a method for mounting an airbag assembly to a vehicle structure. In these embodiments, the airbag assembly 110 may comprise an airbag housing 118, an airbag 114, and an inflator 140. The method of mounting an airbag assembly includes the step of installing the airbag 114 into the airbag housing 118. The airbag housing 118 may also be engaged by a B-ring, which may either be B-ring 10, B-ring 310, or any other B-ring described herein. The B-ring may comprise a base surface 14, a first stabilizing bracket 30, and a second stabilizing bracket 50, wherein the first and second stabilizing brackets 30, 50 extend away from the base surface 14. The method may also include the step of attaching the inflator 140 to either the first stabilizing bracket 30 or the second stabilizing bracket 50. In some embodiments, the inflator 140 is attached to the first stabilizing bracket 30. In other embodiments, the inflator 140 is attached to the second stabilizing bracket 50.

The step of attaching the B-ring to a vehicle bracket 134 may also be performed. In some embodiments, the vehicle bracket 134 is attached to the second stabilizing bracket 50. In other embodiments, the inflator 140 is attached to the first stabilizing bracket 30. In additional embodiments, the inflator 140 is attached to the second stabilizing bracket 50. In some embodiments, the vehicle bracket 134 is attached to the first stabilizing bracket 50 or the additional stabilizing bracket 80.

In some embodiments, the method additionally comprises the step of obtaining the components for an airbag assembly 110. These components may include the airbag 114, the housing 118. Once these components have been obtained, a retainer ring (not shown) may be installed. The components may also be installed into the B-ring. Once the B-ring has been installed, the airbag 114 may be folded and attached to a protective cover. The folding of the airbag 114 may be needed to ensure that the airbag 114 fits completely within the housing 118. This cover may, in some embodiments, be protective cover 122 and/or protective cover 326. Once the cover 122, 326 has been installed, the inflator 140 may be installed into the airbag assembly 110. The vehicle bracket 134 may also be installed. Finally, if desired, a label 136 may be included as part of the airbag assembly 110. In some embodiments, the installation of the label 136 may be the last step in assembling the airbag assembly 110.

It should be noted that using the present embodiments may provide advantages over previously known systems. For example, using an airbag assembly with a B-ring of the present embodiments may reduce the weight of the airbag system. Likewise, using an airbag assembly of the present embodiments may reduce the cost and/or complexity of the passenger airbag system. Further the B-rings described herein are inexpensive and provide a single attachment to the vehicle structure, thereby reducing the number of parts and processes needed to install the airbag system into the vehicle. In fact, only a single installation or assembly process may be required. Further, by using a B-ring in conjunction with the airbag assembly, the B-ring can operate to stabilize the inflator and/or the CCB bracket during the assembly process, during handling of the system, etc. In other situations, the use of the B-ring may be advantageous as it will position the inflator distal from the B-ring (and airbag housing) during testing (such as bonfire testing, deployment testing, etc.). Further embodiments may be designed in which the use of the B-ring operates to prevent the airbag assembly and/or inflator from sliding out of the B-ring while the system/assembly is being handled.

Further, the use of the present embodiments may also be advantageous, in some situations, in that the airbag module can easily be installed into the vehicle's instrument panel. In other situations, the B-ring may support and hold the inflator during the assembly process. Moreover, by varying the length of the CCB bracket (or other feature) the position of the B-ring can be readily adjusted relative to the instrument panel, thereby allowing the airbag module to be readily adapted to fit other sizes and types of vehicles. In other situations, the use of the B-ring may provide an easy assembly process that the installation of the inflator and the airbag into the airbag assembly is essentially "error-proof."

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An airbag assembly comprising:
    an airbag housed within an airbag housing;
    an inflator; and
    a B-ring that engages the airbag housing, the B-ring comprising a base surface, a first stabilizing bracket, and a second stabilizing bracket, wherein the first and second stabilizing brackets extend away from the base surface, at least one of the first stabilizing bracket and the second stabilizing bracket have a flange disposed at the far end of such stabilizing bracket, the flange disposed substantially parallel to base surface and wherein the first and second stabilizing brackets restrict movement of the airbag housing in a vertical and lateral direction.

2. The airbag assembly as in claim 1 further comprising a vehicle bracket that is capable of being attached to a vehicle structure, wherein the second stabilizing bracket is secured to the vehicle bracket.

3. The airbag assembly as in claim 1 further comprising a protective cover that covers the airbag, wherein the protective cover engages the base surface.

4. The airbag assembly as in claim 1, further comprising:
    a plurality of holes positioned around the periphery of the base surface; and
    one or more housing panels added to the airbag housing, wherein the housing panels comprise one or more holes, wherein the holes on the housing panel align with the holes on the base surface.

5. The airbag assembly as in claim 1, wherein the first stabilizing bracket abuts a first lateral surface of the housing and the second stabilizing bracket abuts a second lateral surface of the housing.

6. The airbag assembly as in claim 1 wherein the first stabilizing bracket connects to the inflator.

7. The airbag assembly as in claim 1 further comprising an additional stabilizing bracket positioned adjacent to the second stabilizing bracket, wherein the additional stabilizing bracket abuts a second lateral surface of the housing.

8. The airbag assembly as in claim 7 wherein the additional stabilizing bracket and the second stabilizing bracket are each connected to the inflator.

9. The airbag assembly as in claim 1 further comprising one or more hooks that are positioned around the periphery of the base surface.

10. The airbag assembly as in claim 1, wherein the B-ring is stamped from a single piece of material, wherein the first stabilizing bracket and the second stabilizing bracket are folded so that they extend away from the base surface.

11. The airbag assembly as in claim 1, wherein the B-ring is molded into a configuration so that the first stabilizing bracket and the second stabilizing bracket extend away from the base surface.

12. The airbag assembly as in claim 1, wherein the base surface, the first stabilizing bracket, and the second stabilizing bracket were individually formed and then attached together.

13. A B-ring designed for use in an airbag assembly, the B-ring comprising:
    a base surface;
    a first stabilizing bracket that extends away from the base surface, wherein the first stabilizing bracket has a first flange disposed at the far end of the first stabilizing bracket, the first flange being disposed substantially parallel to the base surface and is constructed to engage and restrict movement of the airbag housing in a vertical direction and a lateral direction; and
    a second stabilizing bracket extend away from the base surface, wherein the second stabilizing bracket has a second flange disposed at the far end of the second stabilizing bracket, the second flange being disposed substantially parallel to the base surface and is constructed to engage and restrict movement of the airbag housing in the lateral and vertical direction.

14. The B-ring as in claim 13 wherein the first stabilizing bracket is constructed to attach to an inflator.

15. The B-ring as in claim 13 wherein the B-ring further comprises an additional stabilizing bracket.

16. A method for mounting an airbag assembly to a vehicle structure, the airbag assembly comprising an airbag housing, an airbag, and an inflator, the method comprising:
    installing the airbag into the airbag housing;
    engaging the airbag housing with a B-ring, wherein the B-ring comprises a base surface, a first stabilizing bracket, and a second stabilizing bracket, wherein the first and second stabilizing brackets extend away from the base surface and have at least one flange disposed at the far end of at least one of the first and second stabilizing brackets, the flange being disposed substantially parallel to the base surface and;
    attaching the inflator to either the first stabilizing bracket or the second stabilizing bracket; and
    attaching the B-ring to a vehicle bracket.

17. A method as in claim 16, wherein the vehicle bracket is attached to the second stabilizing bracket.

18. A method as in claim 16 further comprising the steps of:
    obtaining the airbag and the housing;
    installing the airbag and the housing into the B-ring; and
    folding the airbag so that it fits within the housing.

19. A method as in claim 18, wherein the cover comprises a label.

* * * * *

UNITED STATES PATENT AND TRADEMARK OFFICE
CERTIFICATE OF CORRECTION

| | | |
|---|---|---|
| PATENT NO. | : 7,770,914 B2 | Page 1 of 1 |
| APPLICATION NO. | : 11/888020 | |
| DATED | : August 10, 2010 | |
| INVENTOR(S) | : Conrad Dumbrique | |

It is certified that error appears in the above-identified patent and that said Letters Patent is hereby corrected as shown below:

Please change item 74 Attorney, Agent, or Firm from "Madison IP, P.C." to --Madson IP, P.C.--

In column 16, claim 13, line 19, please replace "extend" with --that extends--

Signed and Sealed this

Sixteenth Day of November, 2010

David J. Kappos
*Director of the United States Patent and Trademark Office*